United States Patent

[11] 3,594,571

| [72] | Inventors | Horst Schonbrodt<br>Stamwarde, Hamburg;<br>Volkmar Listing, Hamburg, both of,<br>Germany |
|---|---|---|
| [21] | Appl. No. | 760,848 |
| [22] | Filed | Sept. 19, 1968 |
| [45] | Patented | July 20, 1971 |
| [73] | Assignee | H. Jungheinrich & Co. Maschinenfabrik<br>Hamburg, Germany |
| [32] | Priority | Mar. 23, 1967 |
| [33] | | Germany |
| [31] | | J 33283 |
| | | Continuation-in-part of application Ser. No.<br>714,927, Mar. 21, 1968. |

[54] VEHICULAR GUIDANCE SYSTEM WITH COLLISION PREVENTION
5 Claims, 10 Drawing Figs.

[52] U.S. Cl. .................................................. 246/66,
   246/8
[51] Int. Cl. .................................................. B61l 23/16
[50] Field of Search .......................................... 179/82;
   343/719; 246/66

[56] References Cited
UNITED STATES PATENTS

| 1,433,599 | 10/1922 | Bown ........................... | 343/178 |
| 1,526,130 | 2/1925 | Gardiner ................. | 246/187 (C) (UX) |
| 1,877,626 | 9/1932 | Loughridge ............. | 246/187 (C) (UX) |
| 2,419,833 | 4/1947 | Grimes ........................ | 179/82 |
| 2,762,913 | 9/1956 | Jepson .................... | 246/187 (C) (UX) |
| 3,190,646 | 6/1965 | Forsman ....................... | 246/187 X |
| 3,188,978 | 6/1965 | Dolphin et al. .............. | 104/247 |
| 2,049,154 | 7/1936 | Chireix ......................... | 246/8 |

FOREIGN PATENTS

| 643,251 | 9/1928 | France ......................... | 246/66 |
| 1,081,474 | 8/1967 | Great Britain ................ | 246/187 B |

*Primary Examiner*—Arthur L. La Point
*Assistant Examiner*—George H. Libman
*Attorney*—Karl F. Ross ABSTRACT: A vehicular guidance system for self-propelled vehicles moving along a track includes a series of elongate conductors following one another in overlapping relationship, each conductor having a leading portion on one side and a trailing portion on the other side of the track for cooperation with a high frequency transmitter and a corresponding receiver, respectively, aboard each vehicle. With the length of each conductor portion exceeding that of a vehicle, signals picked up by the receiver of one vehicle indicate the presence of another vehicle immediately ahead.

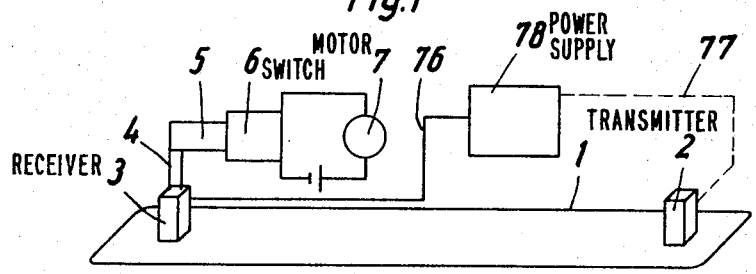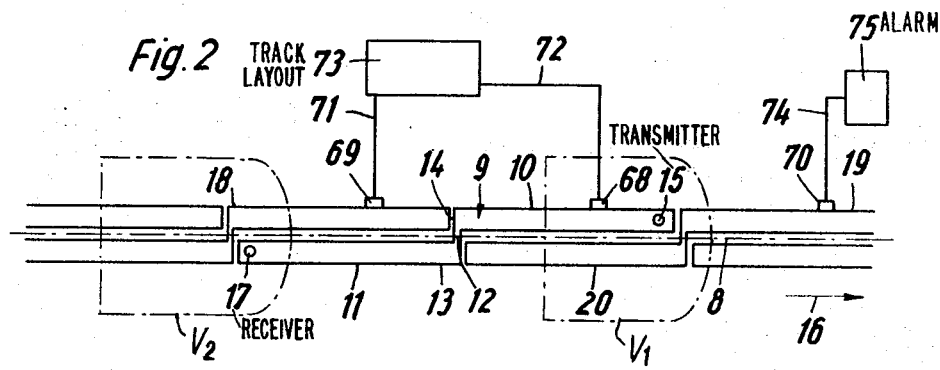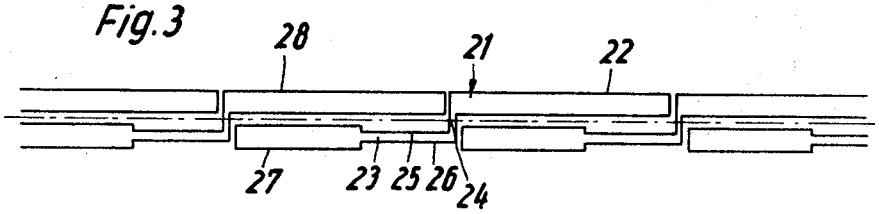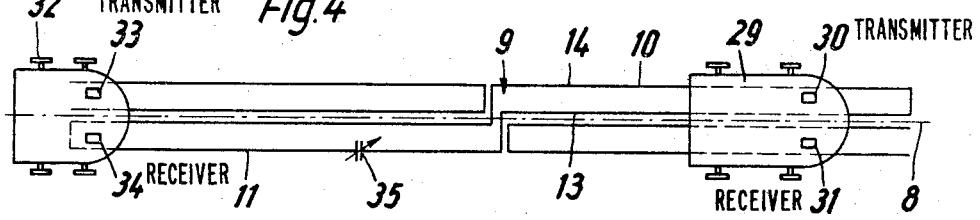

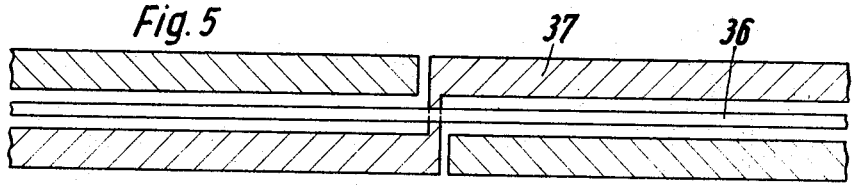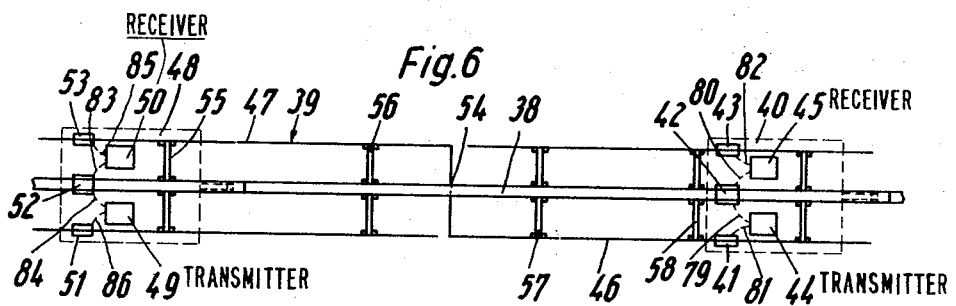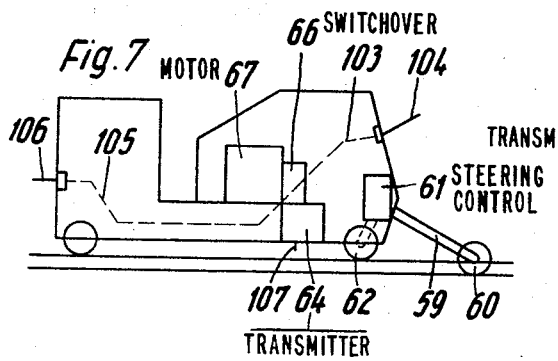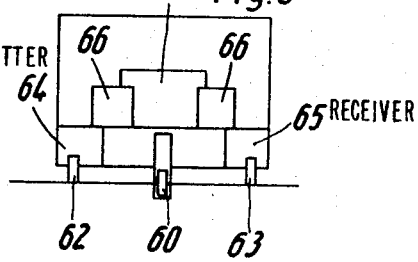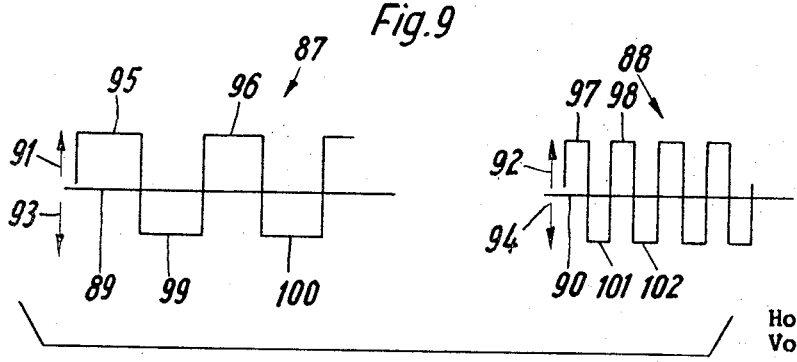

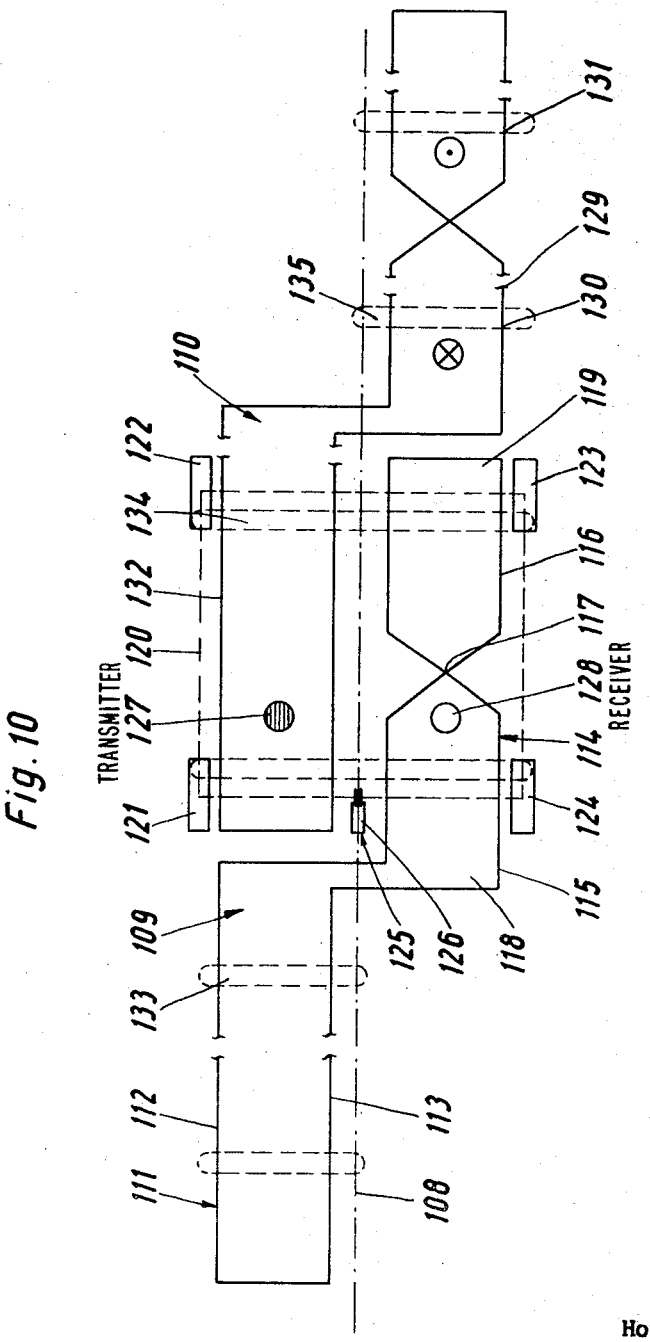

VEHICULAR GUIDANCE SYSTEM WITH COLLISION PREVENTION

This application is a continuation-in-part of our application Ser. No. 714,927 filed Mar. 21, 1968 and consists in substantial part of the disclosure of said application while claiming subject matter in part disclosed therein.

DESCRIPTION

The present invention relates, to an installation for automatically guiding transportation vehicles, comprising guide element determining the vehicular path. In a particularly preferred embodiment of this invention, this guide element is a rail, yet this is not an indispensable feature of our invention.

It is already known to provide an inductive or optical guide for automatic steering. In the first case, an electrical conductor system may be mounted either in or above the floor; in the second, a colored strip may be arranged on the floor. Where inductive guide means are provided, the control and steering means of the vehicle are connected to a receiver adapted to receive the electromagnetic signals from the conductor system. With optical guide means, at least one edge of the tape or strip is scanned by photoelectric cells, or, particularly where the strip is made from a reflecting material, is swept by light beams transmitted from the vehicle with the reflection used for controlling the vehicle drive.

The invention encompasses all these arrangements; however, the preferred construction comprises a guide rail which may be U-shaped and is so fitted into the floor that its open side faces upwardly the vehicle having a sensing wheel running in the channel of this rail.

A positive mechanical guide may, however, also be formed by a rail mounted above the track and above the floor; this modification is also within the scope of the invention.

The present invention also includes a transportation vehicle for use in an installation of this kind. In accordance with the preferred embodiment just described, the vehicle is equipped with corresponding sensing rollers, or with transmitters and receivers for optical radiation or electrical energy, in order to guide the vehicle along the guide rail.

In order to define a track, such a guide rail may be designed with several curves. Frequently it will be mounted in bearings in the form of a closed track with a plurality of stations, where the vehicles may be loaded and unloaded.

Installations for positively guiding vehicles are already known, for example, from commonly owned German patent application, No. J 25531 II/63c, German Pat. No. 312,193, German printed specification No. 1,116,081 French Pat. No. 806,464, and U.S. Pat. No. 2,718,194.

In these installations, there arises the problem that vehicles tend to travel at different speeds since, even with uniformly set drives, changes in speed will occur with all vehicles as a function of the load carried. In other systems, operating for example with points or switches and carrying out different programs for vehicle control, the vehicles cannot always be perfectly supervised, particularly where the execution of the program varies in duration.

It is therefore necessary to prevent damage to the vehicles caused by collisions or "bumping," or preferably to avoid such collisions altogether. For preventing damage, bufferlike sensors can be provided which deenergize the vehicle drive on encountering a resistance. For avoiding collisions, it has been proposed to equip the vehicles with a light source at one and with a light receiver at the other end. However, here the estimate of the distance along a straight track is rather uncertain and also the reliability of the interaction between light source and light receiver cannot be guaranteed, especially where vehicles travel along bends.

The invention has the object of providing an installation in which, preferably with a continuous guide element, collisions of vehicles are reliably prevented without the use of any structure extending between the vehicles into their path, which would increase the risk of accidents.

According to the invention, this object is realized in that there are arranged, for sectional or control, several oblong, electrically conducting elements arranged in sections at opposite sides of the guide element in staggered relationship with a central section of each conducting element crossing the guide element; the sections of the laterally positioned conducting elements are longer than a self-propelled vehicle, traveling along the track. The vehicles are equipped, laterally of their longitudinal centerline, with a transmitter, on one side and with a receiver on the other side, these transducers facing the juxtaposed conducting elements and being relatively offset to an extent corresponding to the mean spacing of these elements; the receiver controls or stops the vehicle drive as a function of a signal. Speed control by intermittent actuation is also possible. With forward and rear portions of successive loop-shaped conducting elements paralleling one another on opposite sides of the guide element or track, a certain mutual electromagnetic coupling or crosstalk may arise between successive loops.

Such a coupling between different electrically conducting elements is prevented, in a preferred embodiment of the invention, in order to ensure that under all conditions the effect of the signals is limited to the intended region, namely the confines of one conductor loop.

This is achieved by providing the conductors of each closed loop with at last one crossover point in one of their two principal elongated portions. Loop portion is the rear section associated with the receiver of the vehicle. In the preferred embodiment only one crossover point is provided in each such section. Thus, this loop portion is effectively divided into two subsections which directly follow one another on the same side of the guide element and which, because of the crossover, are traversed in opposite senses by a current induced by the transmitter signals. Field lines which are created in this section of the conductor loop link the two subsections on a closed path so that neighboring sections of other conductor loops are unaffected.

The guide element may also be mounted as a guide rail above the floor while the conducting elements are arranged in the floor, in which case the arrangement of the conducting elements on both sides of the guide element is determined by the vertical ground projection of this element. It is important that these elements be located, with regard to the path of the vehicle, with one section under one side of the vehicle and with the other section under the other side of the vehicle so that one section is associated with the transmitter and the other with the receiver, and a signal fed into the system by a transmitter of one vehicle is received by a receiver of another vehicle.

Preferably, the section associated with the transmitter, or with the transmitter side of the vehicle, leads in the direction of travel.

This arrangement solves in a surprising and unexpected manner the problem of preventing collisions, because a vehicle along a transmitter-side conductor section signals receiver-side section immediately behind it to stop a vehicle entering the corresponding track portion.

A particularly advantageous embodiment of the invention provides for contactless transmission of high-frequency signals between the transmitter and the conducting element on the one hand, and between the conducting element and the receiver on the other hand, and the alternating energization of the transmitter and receiver of a vehicle, the transmitters of all vehicles operating on the same frequency. The alternating energization has the object of preventing a vehicle from stopping itself, particularly with narrow spacing between transmitter and receiver, according to the width of the vehicle, or within the zone of a crossover of the conducting element over the guide element.

According to a further preferred feature of the invention, controls are provided for differently adjusting the rhythm of alternating transmitting and receiving periods on different vehicles. This is a safety measure in order to prevent the alternating transmitting and receiving periods of successive vehicles from being in complete synchronism; the different operating rhythms cause always a certain overlap between the transmission and reception periods of successive vehicles.

A preferably adjustable capacitor is advantageously mounted in every conductor loop for tuning it to the signal frequencies. Since all transmitters must be set to operate at the same frequency, the conductor loops must be matched to the resonance frequency in order to reduce energy consumption. Certain deviations in the conductor loops may result from tolerances during the assembly or from ambient conditions. In a simple arrangement, adjacent conductors of successive loops have their juxtaposed sections side accommodated in the same floor groove.

In a preferred physical realization of the installation according to the invention, the conducting elements are arranged in or at least on the floor and the guide element is also arranged on the floor, and the conducting elements are insulated against the guide element at the crossing points. In this way a contactless arrangement is provided, particularly where the conducting elements are arranged to form a loop, in which no switching or transmission apparatus is necessary, apart from the closed loops in the floor or in the zone of the floor mounted installation. Furthermore, this installation makes do with an extraordinarily low power, because of the small distance from the transmitter and the receiver to the conductor loop, and the loop conductors can have be sufficiently separated, at least in part, to receive substantial energy levels in view of the directive transmission of the signals.

According to a further feature of the invention, the conducting elements may be provided with a tap and may be connected with a signaling device. Such a device may be a track layout on which the positions of the vehicles are indicated by lamps. Moreover, the signaling device may also be immediately adjacent to a warning device, e.g. where the track crosses a corridor. The warning device may be connected to an automatic barrier, as known per se. Furthermore, door-opening mechanisms may be operated in this manner by a tap on a conductor loop upon the approach of a vehicle. Obviously, amplifiers may be inserted between the conductor loop and an operating mechanism.

According to yet another feature, the tap is a transmitter which is energized by the presence of electrical energy at or in the conducting element.

In the case of the preferred embodiment in which the guide element is a floor-mounted rail for the sensor roller, and also the conducting elements are sunk into the floor, we propose to connect the guide rail to an elongated conducting loop lying substantially in the plane of the vehicular track, extending over a section of its length on one side and over another section of its length on the other side of the guide rail, in insulated relationship therewith and crossing same between these sections in an insulated manner. Hence, such an installation may be easily assembled, because these rail parts may be embedded in the floor in one operation. Advantageously, for the reasons pointed out above, the conductors forming the loop cross at one or more points of one of these sections, this transposition substantially preventing the generation of stray electromagnetic fields with resulting crosstalk between adjoining loops.

It is also within the scope of the invention to provide more than one crossover in each such other section of the loops. The preferred form however has one crossover at approximately the center of the section, thus forming two loop subsections.

It is also pointed out that the conducting element forming a loop lies in one plane which corresponds essentially with the track surface for the vehicle of the installation.

On the floor of a transportation vehicle, having the above-mentioned equipment for being guided along such an element, there are provided in the preferred embodiment a transmitter and a receiver on opposite sides of its longitudinal axis, the vehicle being equipped, with an automatic control for the alternating intermittent operation of transmitter and receiver; switching mechanism for the vehicle drive, is actuated as a function of a signal received by the receiver.

The invention will be further described, by way of example, with reference to preferred embodiments diagrammatically illustrated in the accompanying drawing only the features necessary for understanding the same.

In the drawing:

FIG. 1 shows the principle of alternating control, using a conductor loop as a conducting element;

FIG. 2 is a top view of a track section with several topped conductor loops;

FIG. 3 is a top view of another embodiment of a conductor loop;

FIG. 4 shows a track section with a conductor loop underlying two vehicles;

FIG. 5 is a top view of a track section with a strip for capacitive coupling;

FIG. 6 is a top view of an arrangement for mechanical sensing;

FIG. 7 is a diagrammatic side elevation of a vehicle;

FIG. 8 is an end view of the vehicle of FIG. 7;

FIG. 9 shows diagrammatic graphs of the receiving and transmitting characteristics for different vehicles; and FIG. 10 is a plan view of a track section with adjoining loops having relatively transposed conductive portions and a vehicle shown in broken outline.

FIG. 1 shows an endless conductor loop 1 arranged not according to the invention but rectilinearly. A transmitter 2 is located at one end and a receiver 3 at the other end. Both transmitter and receiver include antennae of the ferrite type, these antennae being located substantially near the loop and so directed as to induce signals in the loop or to extract signals therefrom by inductive means. When the transmitter transmits high-frequency signals, corresponding signals are received by the receiver 3. It should be remembered that the transmitter 2 and the receiver 3 are located in different vehicles proceeding in the direction of the conductor loop. For these high-frequency signals frequencies of the order of magnitude of 500 c/s up to about 40 kc./s. are suitable. Obviously, the conductor loop 1 serving as a coupling member between the transmitter 2 and the receiver 3 may be so tuned as to produce resonance for a selected frequency. For this reason, where corresponding values do not result from the design of the loop itself, tuning means are preferably fitted in the conductor loop.

The receiver 3 mounted on a vehicle is connected by connecting means 4 to an actuating member 5 which actuates a control device 6, adapted to stop the drive motor of the vehicle. If this drive motor 7 is an electric motor, the control device 6 may be a switch inserted in the motor circuit.

The parts 2 to 7 are located on a vehicle such as those shown in FIG. 4 at 29, 32 or in FIG. 6 at 40, 48. Naturally, the transmitter 2 and the receiver 3 are also connected via connections 76, 77 to an energy source 78 for supplying power thereto; this power supply is included in the unit 66 shown in FIGS. 7 and 8 which controls the alternating switching of transmitter and receiver.

FIG. 2 shows the improved construction, according to the invention, of conductor loops disposed along a track. The track may be defined, for example, by a U-rail 8 open at the top and mounted in the floor; a sensor wheel runs in this rail 8 for steering the vehicle. The loop, shown generally at 9, has one section 10 on one side of the guide rail and another section 11 on the other side thereof. Both sections extend parallel to the guide rail which is crossed by the two conductors 13 and 14 of the loop. If the guide rail is of conducting material, the crossover must be perfectly insulated.

In the sections 10 and 11, the two conductors 13, 14 are spaced from each other by a certain distance of, for example, about 11 to 17 inches. The conductor located immediately next to the guide rail may also be slightly spaced therefrom.

The spacing and the width of the conductor loops are so dimensioned as to enable a good coupling with the transmitter and receiver to be established, as will be further described with reference to FIG. 4. If the conductor loop contains at 15 a transmitter aboard vehicle $V_1$ moving in the direction of the arrow 16, the conductor loop will transmit a signal to a receiver 17 aboard a following vehicle $V_2$ whereby the same is stopped in response to the signal received. This effectively prevents a collision.

As is apparent from a study of FIG. 2, the track is subdivided by the conductor loops 9, 18, 19, overlappingly disposed on opposite sides of the guide rail 8, into individual track sections in which the monitoring of approaching vehicles is carried out. Suitable dimensioning of the conducting elements 9, 18, 19 prevents the control action of one vehicle from extending unrestrictedly over the whole track. On the other hand, owing to the overlap, the collision protection extends practically without break over the entire track. Another advantage is that the amount of energy required for the control is small, because it serves only for transmitting a signal over a limited track section, corresponding to the length of a loop 9.

Since every vehicle is equipped with a transmitter and a receiver transversely spaced from each other, in order to avoid the receiver being affected by the transmitter mounted on the aforementioned same vehicle, the intermittent control can be carried out so that also a certain crosstalk, for example from section 10 of loop 9 to section 20 of loop 19, remains ineffective.

FIG. 3 shows an arrangement which requires less coupling energy. If, according to FIG. 2, the upper sections of the conductor loops (as viewed in these FIGS.) are associated with the transmitter, then, as shown, for example for the conductor loop 21, the transmitter-side loop section 22 has a uniform width over its length whilst the receiver-side section 23 is narrower in front of the crossover, i.e. with a smaller distance between the conductors 25, 26. At the rearward end 27, the section 23 has again a greater width, in order to accomplish a good inductive coupling with the receiver of any following vehicle whenever the conductor loop 21 carries signals. When the vehicle passes beyond the crossover point 24, a following vehicle will be stopped when reaching the left end of the section 23 of the conductor loop. It follows from the preceding that the conductor loop sections must have the length of a vehicle or train. If the preceding vehicle is still in front of the crossover at 24, a following vehicle will be stopped by the signal transmission via the conductor loop 28.

A pair of vehicles moving over a conductor loop such as loop 9 of FIG. 2 are shown, by way of example, in FIG. 4. It may be seen that a preceding, first vehicle 29 has on its left side a transmitter 30 and on its right side a receiver 31. The second, trailing vehicle 32 has on its left side a transmitter 33 and on its right a receiver 34. In the embodiment shown, the conductor loop has a length several times that of the vehicle. This greater length is to be preferred because it enables trailers to be pulled by the vehicles. The vehicles travel by means of wheels on the floor in which the guide rail 8 is mounted. A sensor roller runs in the rail 8, as will be subsequently explained with reference to FIG. 7. The leading vehicle 29 moves with its transmitter 30 over the section 10 of the loop 9 and induces therein a signal. When the vehicle 32 reaches the zone of the loop section 11, its receiver 34 tuned to the same frequency receives this signal and stops the vehicle 32.

It should be stressed at this point that a conductor loop is not limited to the use of one turn. Several turns may be arranged in the manner of conductors 13, 14. FIG. 4 also shows a turning capacitor in the conductor loop 9, whereby resonance with the transmitted signals may be achieved.

In FIG. 5, strips of conducting material 37 are mounted on either side of a sunken guide rail 36. These strips have a shape with regard to the guide rail 36, conforming to the area of the loop 9 in FIG. 2. For a capacitive transmission of the signals, the use of strips is recommended.

FIG. 6 shows a track section similar to that of FIG. 4. A floor-mounted guide rail 38, cooperating with a sensor wheel, is associated with a conducting element 39, also in the form of a rail. The guide rail 38 consists of conducting material.

In this arrangement, the principle of the crossover of the conducting element 39 over the rail 39 is maintained and the scanning is effected with a pair of scanners on the transmitter and receiver. Thus, the vehicle 40 may have three sensors 41, 42, 43, of which the sensor 42 is associated both with the transmitter 44 and with the receiver 45. This scanner 42, for example in the form of a brush, sweeps along the guide rail 38, while the other scanner 41 and 43 engage either the section 46 on one side or the section 47 on the other side of the guide rail 38. FIG. 6 shows on the vehicle 40 the connections 79, 80 for the central sensor 42, one connector 80 leading to the receiver 45 whereas the other connector 79 extends to the transmitter 44. This transmitter is connected by a connector 81 to the sensor 41, the receiver 45 being connected by a connector 82 to the sensor 43.

For the other vehicle 48, the corresponding connections between transmitter 49 and receiver 50, on the one hand, and the central sensor 52, on the other hand, are shown at 83, 84; the links between the receiver 50 and the sensor 53 are designated the connection between the transmitter 49 and the sensor 51 being indicated at 86.

The transmitter 44 of the vehicle 40 applies a voltage signal to the conductor system formed by the guide-rail section 38 and the conducting element 39. When a trailing vehicle with a corresponding arrangement of transmitter 49 and receiver 50, as well as sensors 51, 52, 53 reaches the conducting element 39, its brushes 52, 53 pick up the signal and apply it to the receiver 50 which causes the vehicle to stop in response to the received signal.

FIG. 6 shows also a track section for an installation according to the invention. This track section consists of a section of the guide rail 38 and the conducting element 39 insulatedly secured at 54 to the guide rail 38; it may also be mounted by insulating spacers 55, 56, 57 on further sections of the guide rail 38. This track unit may be mounted in the floor in one operation.

The vehicle according to FIGS. 7 and 8 has at its front end a forwardly directed, pole-shaped arm 59 with a sensor roller 60, which runs in the channel formed by the U-shaped guide rail. Inside the vehicle, the swing of the polelike arm is transmitted via a steering mechanism 61 to the front wheels 62, 63, as is known per se. In addition, the vehicle has, for example, at 64 a transmitter and at 65 a receiver. The antennae of these apparatus are directed towards the vehicle bottom lying about 2 to 3 inches above the floor level on which the vehicle travels so that there is a comparatively tight coupling with the conducting element, e.g. according to FIGS. 2 to 4, located in the floor. If an embodiment according to FIG. 6 is used, the sensors project downwardly and brush the floor or the rails.

Transmitter and receiver are connected by a switchover unit 66, comprising, for example, a multivibrator, controlling the alternating energization of the transmitter and receiver and also containing switching means, not shown, in order to stop the drive motor 67 of the vehicle on reception of a signal by the receiver.

For example, in the vehicle shown in FIG. 7, a connection 103 leads from the switchover unit 66 to an additional front antenna 104, and a connection 105 to a rear antenna 106, these antennae supplementing the downwardly directed antenna elements of the transmitter and receiver. One such antenna element is shown at 107. The antennae 104 and 106 serve to form a wireless return path between the various vehicles, the connectors 103 and 105 being directed by the unit 66 towards the receiver or the transmitter. This construction is recommended for a capacitive coupling between the transmitter and strip a conductor on the one hand, and between the receiver and the strip on the other hand, an example of the positioning of the conducting elements being given in FIG. 5.

FIG. 2 shows another construction. By way of example, the conductor loops 9, 18 and 19 have taps 68, 69 and 70. These taps may be connected by leads 71, 72 to a track diagram as layout at 73 which has a signal lamp for every track section defined by a conductor loop, so that the position of every vehicle can be indicated. The track diagram 73 is a stationary signaling equipment, arranged adjacent to the guide track for the vehicles. The leads 71, 72 may contain amplifiers or the like, or the taps 68, 69 may be constructed as transmitters.

The example of the tap 70, which may also be constructed as a transmitter, shows that the connecting means coming from the tap and shown at 74 lead to a stationary signaling or alarm device 75 for a warning system or for a door, in order to actuate the same upon the arrival of a vehicle at the loop 19 when the transmitter applies a signal to this loop.

FIG. 9 shows at 87 the transmitting and receiving characteristics of a first vehicle, and at 88 the transmission and reception times for a second or further vehicle in the system.

With reference to the abscissa 89, 90 the upwardly pointing arrows 91, 92, denote the shapes of the transmission pulses whereas the downwardly pointing arrows 93, 94 indicate the shapes of the received pulses. It can be seen that the outgoing pulses 95, 96 and 97, 98, alternate with incoming pulses 99, 100, and 101, 102, respectively. These pulses can be formed by frequency modulation for transmission and by intermittent energization for reception. It will also be seen that the pulses may have the same basic rectangular shape but that the rhythm or duration of the pulses differs for both vehicles. For example, the pulses 95, 96 or 99, 100 of the vehicle may be twice as long as the pulses 97, 98 and 101, 102 of the other vehicle, i.e. are harmonically related thereto so that different vehicles can reliably receive the impulses transmitted from other vehicles.

In FIG. 10 the vehicle-guiding element, for example a rail, is indicated at 108. Two conductor loops are shown at 109 and 110 adjacent to this rail. The loop 109 includes one section or front portion 111 in which two spaced conductors 112 and 113 extend longitudinally of the track parallel to each other. The other section or front portion 114 of the loop 109 has two conductors 115 and 116 which cross over at a central point 117 and thus form two loop subsections 118 and 119.

The broken line 120 indicates the periphery of a vehicle with four wheels 121, 122, 123 and 124. This vehicle is guided in its path by a conductor element 126 shown schematically at 125 on the guidance element formed for example as the rail 108. The vehicle carries a downwardly directed transmitter 127 and a downwardly directed receiver 128. Preferably, the transmitter and the receiver are each arranged at such a distance from the longitudinal centerline of the vehicle as to move down the middle of their respective conductor loop sections.

The transmitter 127 emits signals which can be picked up in the section 129 of the conductor loop 110, while the receiver 128 picks up signals generated in the section 111 of the conductor loop 109, i.e. signals emitted by a preceding vehicle.

It will be realized that in a practical embodiment the length of each section 111 or 114 of a conductor loop must be much greater than the length of a vehicle, as noted above and indicated in FIG. 10 by the breaks in the loop conductors.

The currents generated by the transmitter 127 in the loop subsections 130 and 131 give rise to field lines having directions as indicated in the drawing by way of example. In the loop subsection 130 the direction might be downward and in the loop subsection 131 it will than be upward. It will be understood that these field lines form a completely closed circuit without affecting the neighboring section in another loop which parallels the section 129 in the same manner as the section 132 of the loop 110 parallels the section 114 of the loop 109. In this way the signals are effectively confined to the conductor loop in which they are generated. When formed as a rail the guidance element 108 consists of a rigid section, e.g. a U-shaped or elevated profile. The conductor loops are connected to the rail in the manner described above by means of transverse couplings 133, 134 and 135.

We claim:
1. A vehicular guidance system comprising:
elongated guide means forming a track;
a plurality of self-propelled vehicles provided with drive means and with sensing means for said track;
transmitting means and receiving means for high-frequency signals aboard each vehicle, said transmitting means being disposed on a first side and said receiving means being disposed on a second side of said track upon alignment of the vehicle therewith;
a plurality of elongated conductor loops disposed along said track in mutually insulated and longitudinally staggered relationship, each of said loops comprising a pair of generally parallel conductors forming a first portion extending alongside the track at said first side for inductive coupling with said transmitting means of a vehicle passing thereover, a second portion extending alongside the track at said second side for inductive coupling with said receiving means of a vehicle passing thereover, said conductors having a crossover point in a single one of said portions for substantially preventing the generation of stray electromagnetic fields, and a connecting portion crossing said track, said first portion preceding said second portion in the direction of vehicle motion and being substantially aligned and coextensive with the second portion of an adjoining conductor loop whereby a high-frequency signal induced in any loop by the transmitting means of a leading vehicle is picked up by the receiving means of a trailing vehicle immediately behind, the length of each of said first and second portions exceeding that of each vehicle;
and control means aboard each vehicle connected to said receiving means thereof and responsive to said signal for arresting said drive means.

2. A system as defined in claim 1, further comprising switchover means aboard each vehicle for making said transmitting and receiving means alternately effective.

3. A system as defined in claim 1 wherein said crossover point is located midway on said second portion.

4. A track member for a vehicular guidance system wherein self-propelled vehicles equipped with track-sensing means and with transmitting and receiving means for the exchange of collision-preventing signals follow one another along a predetermined path, comprising:
an elongated rail element;
an elongated conductor loop positioned for cooperation with said transmitting and receiving means of respective vehicles moving one behind the other along said path, said loop having a first portion with two parallel conductors extending alongside said rail element at one side thereof, a second portion of substantially the same length as said first portion extending alongside said rail element at the opposite side thereof and in longitudinally offset relationship with said first portion, only said second portion being provided with a crossover point, and an intermediate connecting portion crossing said rail element in insulated relationship therewith;
and insulating support means mechanically securing said loop to said rail element.

5. A vehicular guidance system comprising:
elongated guide means forming a track;
a plurality of self-propelled vehicles provided with drive means and with sensing means for said track;
transmitting means and receiving means for high-frequency signals aboard each vehicle, said transmitting means being disposed on a first side and said receiving means being disposed on a second side of said track upon alignment of the vehicle therewith;
a plurality of elongated conductor loops disposed along said track in mutually insulated and longitudinally staggered relationship, each of said loops comprising a pair of generally parallel conductors forming a first portion extending alongside the track at said first side for inductive coupling with said transmitting means of a vehicle passing thereover, a second portion extending alongside the track at said second side for inductive coupling with said receiving means of a vehicle passing thereover, and a connecting portion crossing said track, said first portion preceding said second portion in the direction of vehicle motion and being substantially aligned and coextensive with the second portion of an adjoining conductor loop whereby a high-frequency signal induced in any loop by the transmitting means of a leading vehicle is picked up by the receiving means of a trailing vehicle immediately behind, said conductors being relatively closely spaced in a forward section of said second portion and relatively widely spaced in said first portion and in a rear section of said second portion; the length of each of said sections substantially equaling that of each vehicle;

and control means aboard each vehicle connected to said receiving means thereof and responsive to said signal for arresting said drive means.